Aug. 19, 1941.  E. F. STEINERT  2,253,403
WELDING APPARATUS
Filed Feb. 4, 1939  2 Sheets-Sheet 2
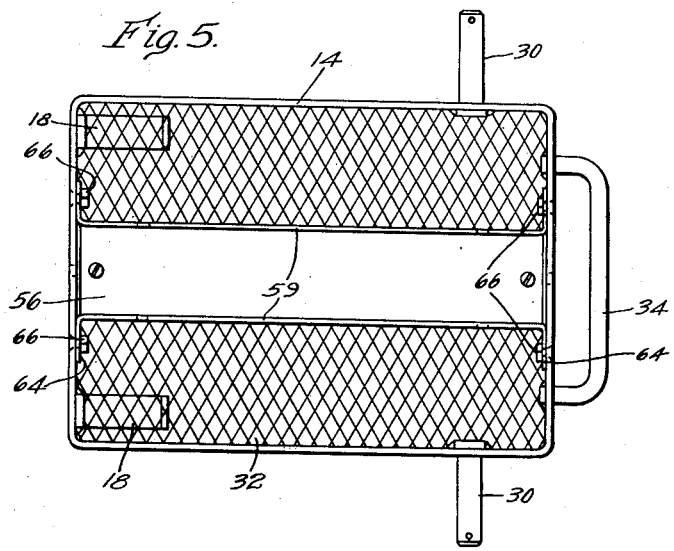
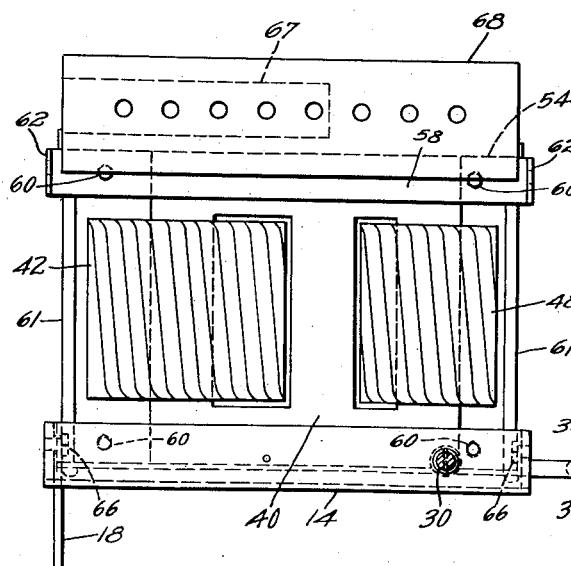
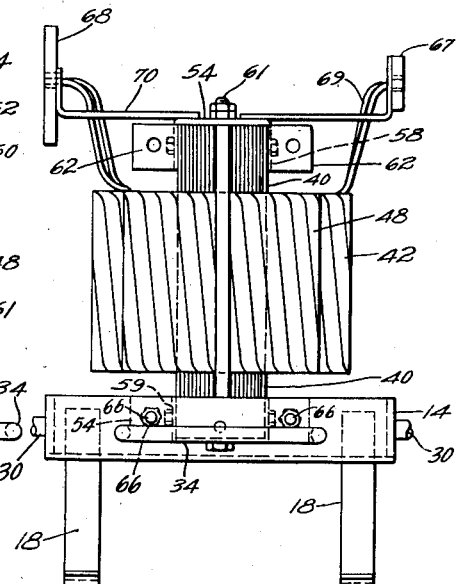
INVENTOR
Emil F. Steinert.

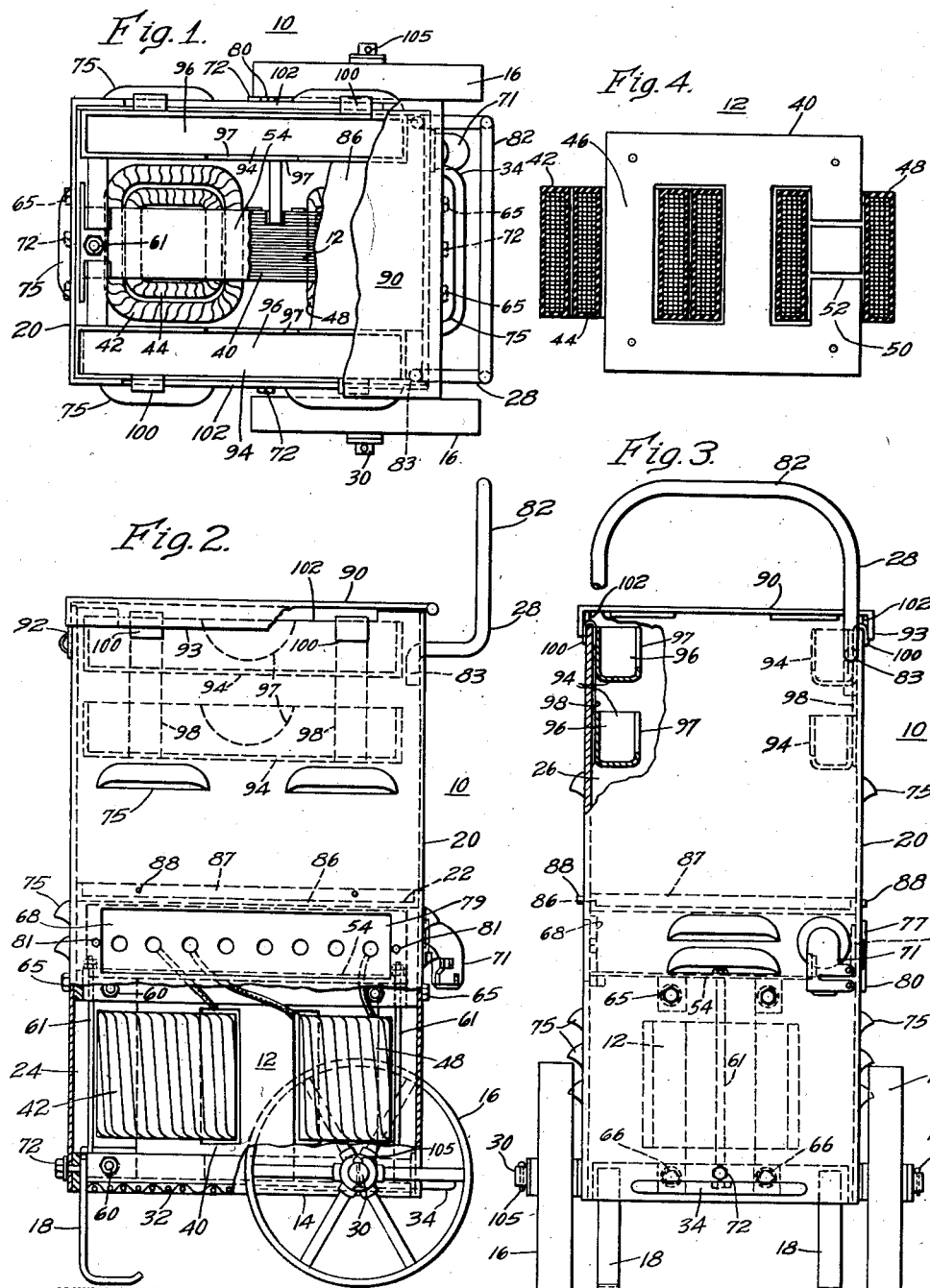

Patented Aug. 19, 1941

2,253,403

UNITED STATES PATENT OFFICE 2,253,403

WELDING APPARATUS

Emil F. Steinert, Sharon, Pa., assignor to Westinghouse Electric & Manufacturing Company, East Pittsburgh, Pa., a corporation of Pennsylvania Application February 4, 1939, Serial No. 254,625

5 Claims. (Cl. 219—8)

My invention relates, generally, to welding apparatus, and it has reference, in particular, to portable arc welders.

An object of my invention, generally stated, is to provide a compact, portable arc welder which shall be simple and inexpensive to manufacture, and which may be readily moved from one location to another.

More specifically, it is an object of my invention to mount an alternating current arc welding transformer-reactor power unit on a wheeled base member and secure thereto a partitioned housing having a lower ventilated compartment for enclosing the power unit and an upper compartment for the accommodation of the necessary welding accessories.

Another object of my invention is to mount a transformer-reactor power unit having a minimum of stray magnetic flux on a wheeled base member in close proximity to a protective metal ventilating screen and secure a partitioned metal housing to the base member for enclosing the transformer-reactor unit and forming an integral part of a handle structure for moving the unit from one location to another.

A further object of my invention is to mount a welding transformer on a substantially open wheeled base member and removably secure to the base member and to the transformer a housing having a lower ventilated compartment for enclosing the transformer and an upper compartment for the accommodation of welding electrodes and other necessary accessories.

A still further object of my invention is to provide a self-contained, portable alternating current arc welder having a lower ventilated compartment enclosing a transformer-reactor power unit, and an upper compartment with a hinged cover for accommodating the necessary welding accessories, and provide for supporting movable electrode racks from the housing so that they may be readily positioned either on the inside or outside of the housing and locked in position by the hinged cover.

Other objects will, in part, be obvious and will, in part, be explained hereinafter.

For a complete understanding of the nature and scope of my invention, reference may be made to the following detailed description, taken in connection with the accompanying drawings, in which:

Figure 1 is a plan view of a portable welder embodying the principal features of my invention, with portions of the cover and partition broken away to show the interior construction;

Fig. 2 is a side elevational view of the welder of Fig. 1 with a portion of the housing broken away to show details of the interior construction;

Fig. 3 is an end elevational view of the welder of Fig. 1 with a portion of the housing broken away to show details of the electrode rack construction;

Fig. 4 is an enlarged view of the transformer-reactor power unit showing the magnetic circuit and arrangement of the windings;

Fig. 5 is an enlarged plan view showing details of the construction of the base member and the lower end frame of the power unit;

Fig. 6 is an enlarged side elevational view of the transformer-reactor and base member assembly; and Fig. 7 is an enlarged end elevational view showing details of the transformer-reactor and base member assembly.

Referring particularly to Figs. 1, 2 and 3 of the drawings, the reference numeral 10 denotes generally a portable alternating current arc welder embodying a preferred form of my invention, herein a transformer-reactor power unit 12 is secured to a base member or frame structure 14 which is provided with wheels 16, and feet 18 for cooperating with the wheels to support the welder when it is in a position of rest.

A horizontally partitioned housing 20 is removably secured to the base member 14 for providing a lower compartment 24 for enclosing the power unit 12 and an upper compartment 26 for accommodating the necessary welding accessories (not shown) such as welding electrodes, welding cables, electrode holder, etc. A handle 28 may be secured to the housing 20 for facilitating movement of the welder from one location to another.

Referring particularly to Figs. 5, 6 and 7 of the drawings, it may be seen that the base member 14 comprises preferably, a rigid open frame structure, formed, for example, by bending a suitable length of metal strap flatwise to form a hollow rectangle and joining the ends thereof by welding. In order to secure the wheels 16 to the base member 14, stub shafts 30 may be inserted in suitable side openings located preferably towards the rear end of the base member, so as to project outwardly therefrom, and secured to the base member by welding. The feet 18 may comprise substantially L-shaped members of metal strap which may be secured to the front end of the base in a suitable manner, such as by welding the leg portions thereto, so that the feet depend therefrom and cooperate with the wheels 16 in supporting the welder when it is in a stationary position, and also provide a brake or skid for preventing accidental movement of the welder when in such position.

As is best illustrated in Figs. 2 and 5, the base member 14 may be provided with a suitable bottom, such as the expanded metal screen 32, which is welded or otherwise attached to the lower edge of the base member 14 for permitting the circulation of air therethrough to ventilate the transformer-reactor unit 12, while preventing the entrance of foreign material to the lower compartment 24 of the housing 20.

In order to facilitate moving the welder from one location to another, a guard member 34 may be secured to the rear of the base member. It may comprise a length of pipe or rod suitably bent, the end portions thereof being, for example, bent at substantially right angles to the central portion in the manner shown in Fig. 5, and welded to the rear end of the base member 14. The guard member 34 is disposed to assist in tilting the welder from a position of rest, the operator placing his foot on the guard member 34 and pushing downward and slightly forward thereon, while exerting a backward pull on the handle structure 28, so as to transfer the entire weight of the welder to the wheels 16.

Referring particularly to Fig. 4 of the drawings, the reference numeral 12 denotes, generally, the transformer-reactor power unit of the welder, which comprises for example, a three-legged magnetic core member 40 having closely coupled primary and secondary windings 42 and 44, respectively, disposed on the end leg 46 thereof, and a reactor winding 48 disposed on the other leg 50 for connection with the secondary winding 44 for controlling the current when welding. The end leg 50 of the magnetic core member 40 is preferably of a relatively high magnetic reluctance being, for example, provided with one or more air gaps 52. These air gaps 52 are preferably positioned within the reactor winding 48 so that the leakage flux produced by any magnetomotive force existing across the air gaps 52 will be prevented from setting up stray magnetic fields, through the interaction of the leakage flux about the air gaps 52 with the turns of the reactor winding 48 which are positioned thereabouts. By utilizing a transformer-reactor power unit having the windings arranged in this manner, the tendency for any stray magnetic fields to exist about the unit is greatly reduced, and the transformer-reactor unit may, accordingly, be secured to the base member 14 without particular reference to the proximity of adjacent magnetic materials such as the screen 32 or the side walls of the housing 20. Accordingly, the portable welder may be made much more compact than would otherwise be possible if other forms of magnetic circuit, having a large amount of stray leakage flux, were utilized for the transformer-reactor power unit. Were a magnetic circuit used having an extensive stray magnetic field, it would be impossible, or at least highly impractical, to mount the power unit in close proximity to any magnetic material, since the stray magnetic field existing about the magnetic core of the power unit would set up eddy currents in the adjacent magnetic material, thus causing increased losses, and resulting in a reduced efficiency of the power unit and undesirable operating characteristics. Accordingly, great clearances would have to be allowed between the power unit and the housing, and other metal parts, thus increasing the size of the welder.

The transformer-reactor power unit 12 may be secured to the base member 14 in any suitable manner, by providing, for example, as shown particularly in Figs. 5, 6 and 7, upper and lower end frame members 54 and 56, respectively, comprising preferably, elongated channel-shaped members which are positioned with the upstanding side portions 58 and 59 thereof about the upper and lower ends of the core member 40, respectively. The end members 54 and 56 may be secured to the core member 40 by transverse bolts 60, and drawn toward each other by bolts 61 extending through the ends thereof. The side portions 58 and 59 of the upper and lower end frames 54 and 56 may be bent outwardly at the ends to provide ears 62 and 64, which may be secured to the housing 20 and to the base member 14, respectively, by means such as the bolts 65 and 66, as shown in Figs. 3 and 5.

In order to facilitate making electrical connections to the transformer-reactor power unit 12, terminal boards 67 and 68 may be mounted on the power unit 12 being, for example, secured by bracket members 69 and 70 respectively, to the upper end frame 54. Suitable connections may be made thereto from the primary winding, and from the secondary winding and reactor winding of the power unit, respectively. A strain type cable connector 71 may be secured to the housing 20 at the rear end thereof for facilitating the connecting of the primary winding 42 to a source of power.

The housing 20 comprises, preferably, as shown in Figs. 1, 2 and 3, a sheet metal casing which may be formed by performing suitable bending operations and welding operations on a sheet steel punching so as to provide a substantially rectangular housing which is disposed to fit about the base member 14, being secured thereto by means such as the bolts 72. Louvers 75 may be provided in the sides of the housing 20 adjacent to the lower end thereof for facilitating the circulation of cooling air through the lower portion 24 of the housing about the transformer-reactor power unit 12 which is positioned therein. Suitable openings 77 and 79 may be provided in alignment with the terminal boards 67 and 68, respectively, for facilitating the making of connections thereto without necessitating the removal of the housing from the base member. A removable cover plate 80 is provided for the opening 79 so that access may be had to the primary connections. The terminal board 68 is disposed to be secured to the housing 20 by means such as the bolts 81 after the housing is secured to the base member 14.

The handle 28 may be secured to the housing 20 adjacent to the upper end thereof to facilitate movement of the welder from one location to another. The handle 28 may, for example, comprise a substantially U-shaped pipe member upon which suitable bending operations are performed to provide the upstanding handle portion 82 and the downwardly projecting end portions 83, as shown in Figs. 2 and 3. The downwardly projecting ends 83 are inserted through suitable openings in the rear wall of the housing 20 and welded to the interior wall of the housing so that the handle 28 becomes an integral part of the housing 20. Additional strength is imparted to the housing 20 by connecting it to the upper end frame member 54 of the transformer-reactor power unit by means of the bolts 65, which are passed through the side wall of the housing to engage ear portions 62 of the upper end frame member 54. The upstanding handle structure 28 provides a convenient bracket for temporarily storing supply or welding cables (not shown) as they may be readily looped thereabouts so as to be out of the way, yet readily available for instant use, and not get in the way of the operator.

The housing 20 is horizontally divided by a partition 86 so as to provide a lower compartment 24 for the transformer-reactor 12 and an upper compartment 26 for accommodating the necessary welding accessories, such as the welding cables, electrode holder, helmet, electrodes, etc. (not shown). As illustrated in Figs. 2 and 3, the partition 86 may comprise a tray having upstanding edges 87 which are disposed to be secured to the housing 20 by means such as the bolts 88. In order to protect the accessories, a hinged cover 90 may be provided for the upper compartment 26, having a hasp 92 by means of which the cover may be locked in the closed position. The cover 90 is provided with downwardly projecting edge portions 93, disposed in spaced relation with the sides of the housing 20.

Suitable racks 94 are provided for storing welding electrodes in the upper compartment. In order to facilitate the changing of electrodes when welding, the electrode racks 94 may comprise open tray members 96, which may be suitably formed from sheet metal so as to have cut away side portions 97 for enabling the operator to readily grasp the electrode therefrom with a gloved hand. The tray members 96 may be secured to hangers 98, which have hooked upper end portions 100 so that the racks may be suspended from the side wall of the housing 20 on either the inside or outside of the upper compartment 26, as desired. In order to prevent the hangers 98 from interfering with the closing of the hinged cover 90, the upper edges of the side wall of the housing 20 are provided with cut away portions 102 for permitting the hangers 98 to be hooked over the upper edge of the housing, either on the inside or the outside of the upper compartment and locked in position by closing the hinged cover 90, so that the depending edge portions 93 of the cover fit closely about the hooked end portions 100 of the hanger members 98.

In assembling the welder, the wheels 16 may be positioned on the shafts 30 and secured thereon by means such as the cotter pins 105. The transformer-reactor power unit 12 may then be secured to the base member 14 by means of the bolts 66 which pass through the ear portions 64 of the lower end frame 56 and are threaded into the base member 14. The housing 20 is then positioned about the transformer-reactor power unit, being secured to the base member 14 by the bolts 72, and braced by means of the bolts 65 which pass through the side walls of the housing 20 and engage the ear portion 62 of the upper end frame 54 of the power unit. The terminal board 68 will then be positioned in alignment with the opening 79 in the housing 20 and may be secured to the housing by the bolts 81 so that connections may readily be made thereto by welding cables having connectors of plug type (not shown) for selecting the desired current for welding. The electrode racks 94 may be hung over the upper edge of the housing 20 and locked in position, either inside or outside, by closing the hinged cover 90.

From the above description and the accompanying drawings, it may be understood that by my invention, I have provided a compact and efficient portable alternating current arc welder which may be easily and inexpensively manufactured and which is simple and economical to use. The housing may be readily removed from the base member for inspection or servicing of the transformer-reactor power unit, without requiring the removal of a multitude of other parts. By providing a lower ventilated compartment for enclosing the power unit which is mounted on the wheeled base member, and an upper compartment for the accommodation of electrodes and other welding accessories, the movement of the welder from one location to another may be greatly expedited, as it is not necessary in moving the welder to separately move the numerous welding accessories which are required in conjunction with the performance of a welding operation. Instead, all accessories may be safely stored within the upper compartment where they are ready and available for use and may be locked therein. When arriving at the weld destination, the electrode racks may be readily removed from the compartment and hung on the outside of the housing within the operator's reach, and the hinged cover may, if desired, be again locked to protect other accessories within the compartment and to secure the electrode racks firmly in position.

Since certain changes may be made in the above description, and different embodiments of the invention may be made without departing from the spirit thereof, it is intended that all the matter contained in the above description or shown in the accompanying drawings shall be considered as illustrative, and not in a limiting sense.

I claim as my invention:

1. A portable arc welder comprising, a substantially rectangular base structure having end and side members mounted in a horizontal position on a plurality of wheels, a metal ventilating screen attached to the base member over the opening therein formed by the end and side members, a transformer reactor power unit mounted on the base structure above the screen, a substantially rectangular-shaped sheet metal housing having an upper compartment and a ventilated lower compartment open at the bottom detachably secured at its lower end to the base structure, said lower compartment enclosing the transformer-reactor power unit, and means detachably securing the housing intermediate its top and bottom to the transformer-reactor power unit to brace the housing and give it greater rigidity with respect to the base structure.

2. A portable arc welder comprising a wheeled base structure having a relatively open metal ventilating screen, a transformer-reactor unit having close-coupled transformer windings and a high reluctance portion of the reactor magnetic circuit within the reactor winding so as to limit stray magnetic fields mounted on the base structure adjacent the metal ventilating screen, a sheet metal housing having a ventilated lower compartment for enclosing the transformer-reactor unit and an upper compartment with a hinged top for the storage of welding accessories detachably secured to the base structure, and a handle secured to the rear wall of the housing for facilitating movement of the welder.

3. A portable arc welder comprising, a wheeled base member, a transformer-reactor unit secured to the base member, a sheet metal housing unit having a lower compartment for housing the transformer and an upper compartment with a hinged cover for storing welding accessories disposed to be removably secured to the base member, and an electrode rack structure disposed to be removably suspended from the upper compartment wall of the housing for positioning either inside or outside the compartment.

4. A portable arc welder comprising, a rigid wheeled base structure having a screened bottom, a low leakage reactance transformer-reactor unit supported by the base structure in close proximity to the screened bottom, a removable sheet metal housing secured to the base structure and having a vented lower compartment for encasing the transformer-reactor unit and an upper compartment with a hinged lid for storing welding accessories, means connecting the transformer and housing at a point relatively distant from the base structure, and a handle secured to the housing for facilitating movement of the welder.

5. A portable alternating current arc welder comprising, a wheeled base structure, a welding transformer removably mounted thereon, a horizontally divided sheet metal housing unit having a lower vented compartment for enclosing the transformer and an upper compartment with a hinged cover for storing welding accessories detachably secured to the base structure, and an electrode rack structure for welding electrodes mounted on a hanger member and removably supported from the uppper edge of the housing on the inside or the outside thereof so as to be locked in position by the hinged cover.

EMIL F. STEINERT.